United States Patent
Liu et al.

(10) Patent No.: US 9,365,132 B2
(45) Date of Patent: *Jun. 14, 2016

(54) METHOD, APPARATUS, SIGNALS, AND MEDIUM FOR MANAGING POWER IN A HYBRID VEHICLE

(71) Applicant: GE Hybrid Technologies, LLC, Albany, NY (US)

(72) Inventors: Wei Liu, Mississauga (CA); Nicolas Louis Bouchon, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/273,305

(22) Filed: May 8, 2014

(65) Prior Publication Data

US 2014/0257612 A1 Sep. 11, 2014

Related U.S. Application Data

(63) Continuation of application No. 12/925,403, filed on Oct. 19, 2010, now Pat. No. 8,738,203, which is a continuation of application No. 11/515,175, filed on Sep. 1, 2006, now Pat. No. 7,826,939.

(51) Int. Cl.
*B60K 6/00* (2007.10)
*B60L 15/20* (2006.01)
(Continued)

(52) U.S. Cl.
CPC ............ *B60L 15/2045* (2013.01); *B60K 6/48* (2013.01); *B60W 10/06* (2013.01); *B60W 10/08* (2013.01);
(Continued)

(58) Field of Classification Search
CPC .............................. B60W 10/06; Y02T 10/56
USPC ............ 701/22, 103, 99; 903/902–904, 906, 903/907; 180/65.28, 65.285, 65.275, 6.5, 180/65.1, 65.21; 290/40 A, 40 B, 40 C, 40 R
See application file for complete search history.

(56) References Cited

U.S. PATENT DOCUMENTS 2,916,635 A 12/1959 Nicita
3,225,542 A 12/1965 Hansen et al.
(Continued)

FOREIGN PATENT DOCUMENTS

CA 2351911 12/2001
EP 0867323 A2 9/1998
(Continued)

OTHER PUBLICATIONS

Zhang, et al., "Control of Hybrid Dynamical Systems for Electric Vehicles", Proceedings of the American Control Conference, Arlington, VA, Jun. 25-27, 2001, pp. 2884-2889.
(Continued)

*Primary Examiner* — Dalena Tran
(74) *Attorney, Agent, or Firm* — Meagher Emanuel Laks Goldberg & Liao, LLP

(57) ABSTRACT

A method and apparatus for managing power in a hybrid vehicle is disclosed. The vehicle includes an engine, an electric motor, and an energy storage element coupled to the motor. The method involves receiving a request to supply operating power to drive the vehicle and responding to the request by selecting an apportionment of operating power between the engine and the motor from among a plurality of apportionments having respective operating costs such that the selected apportionment is associated with a minimum operating cost, the operating cost including at least an engine fuel consumption cost and a storage element lifetime cost. The method further involves causing power to be supplied by at least one of the engine and the motor in accordance with the selected apportionment.

21 Claims, 8 Drawing Sheets

(51) Int. Cl.
  *B60K 6/48* (2007.10)
  *B60W 10/06* (2006.01)
  *B60W 10/08* (2006.01)
  *B60W 10/26* (2006.01)
  *B60W 20/00* (2016.01)
  *F02D 29/02* (2006.01)

(52) U.S. Cl.
  CPC .............. *B60W 10/26* (2013.01); *B60W 20/00* (2013.01); *F02D 29/02* (2013.01); *B60W 2510/244* (2013.01); *B60W 2520/10* (2013.01); *B60W 2520/105* (2013.01); *Y02T 10/56* (2013.01); *Y02T 10/6221* (2013.01); *Y02T 10/6286* (2013.01); *Y02T 10/7258* (2013.01); *Y10S 903/903* (2013.01)

(56) References Cited

U.S. PATENT DOCUMENTS

| | | |
|---|---|---|
| 3,261,007 A | 7/1966 | Frisch |
| 4,086,052 A | 4/1978 | Metcalf |
| 4,407,132 A | 10/1983 | Kawakatsu |
| 4,475,105 A | 10/1984 | Kurssawa |
| 4,905,544 A | 3/1990 | Ganoung |
| 5,327,992 A | 7/1994 | Boll |
| 5,343,970 A * | 9/1994 | Severinsky ............... 180/65.25 |
| 5,345,761 A | 9/1994 | King et al. |
| 5,547,443 A | 8/1996 | Yang |
| 5,898,282 A | 4/1999 | Drozdz et al. |
| 5,939,794 A | 8/1999 | Sakai et al. |
| 6,009,965 A | 1/2000 | Takanohashi et al. |
| 6,083,138 A | 7/2000 | Aoyama et al. |
| 6,098,734 A | 8/2000 | Kawamura |
| 6,098,744 A | 8/2000 | Kawamura |
| 6,242,873 B1 | 6/2001 | Drozdz et al. |
| 6,266,956 B1 | 7/2001 | Suzuki et al. |
| 6,314,346 B1 | 11/2001 | Kitajima |
| 6,319,168 B1 | 11/2001 | Morris et al. |
| 6,335,610 B1 | 1/2002 | Winstead |
| 6,421,599 B1 | 7/2002 | Lippa et al. |
| 6,480,767 B2 | 11/2002 | Yamaguchi et al. |
| 6,500,089 B2 | 12/2002 | Lasson et al. |
| 6,519,513 B2 | 2/2003 | Nakagawa et al. |
| 6,555,991 B1 | 4/2003 | Zettel et al. |
| 6,574,535 B1 | 6/2003 | Morris et al. |
| 6,662,096 B2 | 12/2003 | Komiyama et al. |
| 6,715,572 B2 | 4/2004 | Shimabukuro et al. |
| 6,741,923 B2 | 5/2004 | Katakura et al. |
| 6,768,621 B2 | 7/2004 | Amet et al. |
| 6,809,429 B1 | 10/2004 | Frank |
| 6,879,054 B2 | 4/2005 | Gosselin |
| 6,909,200 B2 | 6/2005 | Bouchon |
| 6,991,052 B2 | 1/2006 | Nogi et al. |
| 7,024,290 B2 | 4/2006 | Zhao et al. |
| 7,178,618 B2 | 2/2007 | Komeda et al. |
| 7,223,203 B2 | 5/2007 | Yamazaki et al. |
| 7,295,902 B2 | 11/2007 | Chen et al. |
| 7,315,774 B2 | 1/2008 | Morris |
| 7,480,555 B2 | 1/2009 | Jacobs |
| 7,549,292 B2 | 6/2009 | Peck et al. |
| 7,562,730 B2 | 7/2009 | Shimizu et al. |
| 7,577,507 B2 | 8/2009 | Morris |
| 7,597,164 B2 | 10/2009 | Severinsky et al. |
| 7,601,092 B2 | 10/2009 | Holmes et al. |
| 8,214,097 B2 | 7/2012 | Severinsky et al. |
| 2002/0065165 A1 | 5/2002 | Lasson et al. |
| 2004/0020206 A1 | 2/2004 | Sullivan et al. |
| 2004/0074682 A1 | 4/2004 | Fussey et al. |
| 2004/0164616 A1 | 8/2004 | Obayashi et al. |
| 2004/0174125 A1 | 9/2004 | Wilton et al. |
| 2004/0254695 A1* | 12/2004 | Komiyama et al. ............. 701/22 |
| 2005/0024061 A1 | 2/2005 | Cox et al. |
| 2005/0057098 A1 | 3/2005 | Bouchon |
| 2005/0080537 A1 | 4/2005 | Cawthorne et al. |
| 2005/0246076 A1 | 11/2005 | Chen et al. |
| 2006/0108163 A1 | 5/2006 | Kitano et al. |
| 2006/0122737 A1 | 6/2006 | Tani et al. |
| 2007/0074516 A1 | 4/2007 | Peck et al. |
| 2007/0149348 A1 | 6/2007 | Holmes et al. |
| 2007/0262586 A1 | 11/2007 | Bouchon et al. |
| 2008/0122228 A1 | 5/2008 | Liu et al. |
| 2008/0236913 A1 | 10/2008 | Ichimoto |

FOREIGN PATENT DOCUMENTS

| | | |
|---|---|---|
| EP | 1375237 A2 | 1/2004 |
| GB | 2267364 A | 12/1993 |
| JP | 1144101 A2 | 6/1989 |
| WO | 0242110 A1 | 5/2002 |
| WO | 02058209 A | 7/2002 |
| WO | 2004071800 A1 | 8/2004 |

OTHER PUBLICATIONS

Lin et al., "Control System Deveiopment for an Advanced-Technology Medium-Duty Hybrid Electric Truck", International Truck & Bus Meeting & Exhibition, Fort Worth TX, Nov. 2003, 10 pages unnumbered.

Chen, et al., "Learning Energy Management Strategy for Hybrid Electric Vehicles", IEEE, pp. 427-432. date is not available.

Lin et al., "A Stochastic Control Strategy for Hybrid Electric Vehicles", Proceeding of the 2004 American Control Conference, Boston, MA, Jun. 30-Jul. 2, 2004, pp. 4710-4715.

C.C. Chan, "The State of the Art of Electric and Hybrid Vehicles", Proceedings of the IEEE, vol. 90, No. 2, Feb. 2002, pp. 247-275.

Supplementary European Search Report for Application No. EP 07800541, including 5 pages (unnumbered).

European Patent Office, Supplementary European Search Report, Application No. EP 07720049, Mar. 16, 2011; 2 pgs. (unnumbered).

European Patent Office, Supplementary European Search Report; Application No. EP 07719724, Jan. 25, 2011, 2 pgs. (unnumbered).

Powers, William F.; Nicastri, PaulR., Automotive Vehicle ControlChallenges in the Twenty-First Century, IFAC, 1999, pp. 11-29, 14th TriennialWorld Congress, Beijing, P.R. China. date is not available.

Barsali, Stefano; Miulli. Carmine; Possenti, Andrea, A Control Strategy to Minimize Fuel Consumption, Series Hybrid Electric Vehicles, Transactions on Energy Conversion, 2004. pp. 187-195, vol. 19-issue No. 1, 1EEE; date is not available.

Kheir, Naim A.; Salman, Mutasim A.; Schouten, Niels J., Emissions and Fuel Economy trade-off for Hybrid vehicles using fuzzy logic, Mathematics and Computers in Simulation, 2004, pp. 155-172, vol. 66, Elsevier B.V. date is not available.

Wayne. W. Srott Clark, NigelN.; Nine, Ralph D.; Elefante, Dennis, A Comparison of Emissions and Fuel Economy from Hybrid-Electric and Conventional-Drive Transit Buses, Energy and Fuels, 2004, pp. 257-270, American Chemical date is not available.

Stengel, Robert. Optimal Control and Estimation MI.E 546, 2006, pp. 1-5, Princeton University School of Engineering and Applied Science, USA. date is not available.

Rahman, Z.; Butler, K.L.; Ehsani, M.; A Study of Design Issues on Electrically Peaking Hybrid Vehicles for Diverse Urban Driving Patterns, 1999, Society of Automotive Engineers, SAE 19 1-1151 date is not available.

Yamamoto, M.; Optimiziation of Heavy Duty Diesel Engine parameters for Low Exhaust Emissions Using the Design of Experiments, 2002, SAE, 2002-01-1148. date is not available.

Johnson, V.H.; Wipke, K.B.; Rausen. D.J.; HEV Control Strategy for Real-Time Optimization of Fuel Economy and Emissons, 2000, SAE paper 2000-01-1543. date is not available.

Shen, S.; Veldpaus, F.E.; Analysis and Control of a Flywheel Hybrid Vehicular Powertrain, IEEE Trans, On Control Systems Technology, vol. 12, No. 5, Sept 2004.

Rao, S.S.; Engineering Optimization—Theory and Practice. 3rd ed., John Wiley & Sons, New York, 1996, pp. 296-299, 616-067. date is not available.

Bellman, R.E.; Dynamic Programming, Princeton University Press. Princeton, NJ, 1957, pp. 12-25. date is not available.

(56) References Cited

OTHER PUBLICATIONS

Won, J.S.; Intelligent Energy Management Agent for a Parallel Hybrid Vehicle, American Control Conference, 2003, pt 3, p. 2560-5, vol. 3.

Schouten, N.J.; Energy Management Strategies for Parallel Hybrid Vehicles Using Fuzzy Logic, Control Engineering Practice. v 11, n 2, 2003, 9171-177. date is not available.

Piccolo, A.; Optimisation of Energy Flow Management in Hybrid Electric Vehicles via Genetic Algorithms, 2001, IEEEIASME I-ternational Conference on Advanced Intelligent Mechatronics, Proceedings, pt 1, p. 434-9. date is not available.

Drozdz, Piotr; Siegenthaler, Richard; Hybrid Powertrain architecture for Medium Duty Commercial Vehicles, EVS 18, Berlin, 2001. date is not available.

\* cited by examiner

METHOD, APPARATUS, SIGNALS, AND MEDIUM FOR MANAGING POWER IN A HYBRID VEHICLE

CROSS-REFERENCE TO RELATED APPLICATIONS

This application is a continuation and claims priority to U.S. Non-Provisional patent application Ser. No. 12/925,403 filed Oct. 19, 2010, which is a continuation of U.S. Non-Provisional patent application Ser. No. 11/515,175, now U.S. Pat. No. 7,826,939, filed Sep. 1, 2006, the disclosures of which are hereby incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of Invention

This invention relates generally to hybrid vehicles and more particularly to managing power in a hybrid vehicle having an engine, an electric motor, and an energy storage element coupled to the motor.

2. Description of Related Art

Hybrid electric vehicles having an engine (such as an internal combustion engine) and an electric motor, for providing power to the vehicle have become a viable alternative to conventional internal combustion engine vehicles. While such vehicles may require more complex power transmission components, this complexity is offset by improved fuel consumption and a corresponding reduction in emissions of pollutants from the engine.

Given the present climate of higher prices for fossil fuels, there is a corresponding desire to further reduce fuel consumption costs when operating hybrid vehicles. Hybrid electrical vehicles reduce fuel consumption by apportioning the power required to operate the vehicle between the engine and electric motor, to cause these components to operate at efficient operating points. For example, when moving slowly or when starting off from a stationary position, the electric motor may be considerably more efficient than the engine and in this case most of the power may be supplied by the motor. At higher speeds, where engine efficiency is better, a greater proportion of power may be supplied by the engine. Accordingly, the management of power distribution between the engine and the motor for a hybrid electric vehicle is an important factor in achieving the best overall efficiency, low fuel consumption, and minimizing operating costs.

There remains a need for improved methods and apparatus for managing power in a hybrid vehicle.

SUMMARY OF THE INVENTION

In accordance with one aspect of the invention there is provided a method for managing power in a hybrid vehicle, the vehicle including an engine, an electric motor, and an energy storage element coupled to the motor. The method involves receiving a request to supply operating power to drive the vehicle and responding to the request by selecting an apportionment of operating power between the engine and the motor from among a plurality of apportionments having respective operating costs such that the selected apportionment is associated with a minimum operating cost, the operating cost including at least an engine fuel consumption cost and a storage element lifetime cost. The method further involves causing power to be supplied by at least one of the engine and the motor in accordance with the selected apportionment.

The method may involve assigning a relative weighting between the engine fuel consumption cost and the storage element lifetime cost, the relative weighting assigned in accordance with fuel prices and storage element replacement prices.

The method may involve producing operating costs for each of the plurality of apportionments.

The motor may be operably configured to receive mechanical power and to generate electrical energy for charging the storage element, the mechanical power being produced while reducing or maintaining a speed of the vehicle, and the method may involve reducing the operating costs in proportion to a quantity of the electrical energy generated while reducing or maintaining the speed of the vehicle.

Causing power to be supplied may involve producing an engine power control signal and a motor power control signal in response to at least one of a drive signal representing an operator requested power received from an operator input device and a current vehicle operating condition, the power control signals being operable to cause a least one of the engine and the motor to supply power in accordance with the selected apportionment.

Producing the power control signals may involve producing power request signals in response to at least one of a current speed of the vehicle, and a current acceleration of the vehicle.

Producing the operating costs for the plurality of apportionments of the requested operating power may involve producing cost values for each of the engine fuel consumption cost and the storage element lifetime cost and combining the cost values to produce an overall operating cost for each of the apportionments.

Combining the operating cost values may involve producing a sum of the operating cost values.

The method may involve storing information representing the plurality of engine fuel consumption costs in a computer memory and producing the operating costs may involve locating an engine fuel consumption cost corresponding to each of the plurality of apportionments of the requested operating power in the memory.

Locating may involve locating an engine fuel consumption cost corresponding to an engine torque and engine speed that satisfies each of the apportionments of the requested operating power.

The method may involve producing a signal representing an operating temperature of the engine and locating may involve locating an engine fuel consumption cost corresponding to the operating temperature.

The method may involve producing a signal representing an actual fuel consumption of the engine while operating the vehicle and updating the fuel consumption information stored in the memory in accordance with the actual fuel consumption of the engine.

Producing the operating costs may involve producing a fuel consumption cost for each of the plurality of apportionments, the fuel consumption cost including a fuel consumption cost associated with operating the engine to supply the apportionment of power, and a fuel consumption cost associated with operating the engine to replace energy supplied by the storage element to operate the motor to supply the apportionment of power.

Producing the fuel consumption cost to replace energy supplied by the storage element may involve producing a prediction of a quantity of electrical energy required to replace the energy supplied by the storage element.

The method may involve storing information representing a plurality of engine fuel consumption costs in a computer memory and producing the fuel consumption cost to replace energy supplied by the storage element may involve locating, in the memory, an engine fuel consumption cost corresponding to a minimum engine fuel consumption for replacing the quantity of electrical energy supplied to the motor by the storage element.

Producing the prediction of the quantity of electrical energy may involve predicting a quantity of electrical energy associated with at least one of a discharge energy loss in the storage element when supplying the quantity of electrical energy to the motor, a motor energy loss when supplying the apportionment of the requested operating power to the vehicle, and a charging energy loss of the storage element when replacing the quantity of electrical energy in the storage element.

The storage element may have a desired state of charge and producing the operating costs may involve producing a storage element lifetime cost proportional to an expected deviation from the desired state of charge associated with operating at each of the plurality of apportionments of the requested operating power.

The method may involve producing a state of charge signal representing a state of charge of the storage element, the lifetime cost for each apportionment being proportional to an absolute value of a difference between the apportionment and a quantity of power required to return the state of charge of the storage element to the desired state of charge.

Producing the operating costs for the plurality of apportionments of power may involve producing operating costs for apportionments that meet at least one constraint criteria associated with an engine maximum power capability, an engine maximum torque capability, a motor maximum power capability, a motor maximum torque capability, a motor maximum braking power capability, a motor maximum braking torque capability, a storage element maximum discharge power, and a storage element maximum charging power.

Selecting the apportionment may involve selecting an apportionment having a minimum operating cost using a golden section search technique.

In accordance with another aspect of the invention there is provided an apparatus for managing power in a hybrid vehicle, the vehicle including an engine, an electric motor, and an energy storage element coupled to the motor. The apparatus includes a processor circuit operably configured to receive a request to supply operating power to drive the vehicle. The processor circuit is operably configured to respond to the request by selecting an apportionment of operating power between the engine and the motor from among a plurality of apportionments having respective operating costs such that the selected apportionment is associated with a minimum operating cost, the operating cost including at least an engine fuel consumption cost and a storage element lifetime cost. The processor circuit is operably configured to cause power to be supplied by at least one of the engine and the motor in accordance with the selected apportionment.

The processor circuit may be operably configured to assign a relative weighting between the engine fuel consumption cost and the storage element lifetime cost, the relative weighting assigned in accordance with fuel prices and storage element replacement prices.

The processor circuit may be operably configured to produce operating costs for each of the plurality of apportionments.

The motor may be operably configured to receive mechanical power and to generate electrical energy for charging the storage element, the mechanical power being produced while reducing or maintaining a speed of the vehicle and the processor circuit may be operably configured to reduce the operating costs in proportion to a quantity of the electrical energy generated while reducing or maintaining the speed of the vehicle.

The processor circuit may be operably configured to produce an engine power control signal and a motor power control signal in response to the request, the request including at least one of a drive signal representing an operator requested power received from an operator input device and a current vehicle operating condition, the power control signals being operable to cause at least one of the engine and the motor to supply power in accordance with the selected apportionment.

The current vehicle operating condition may include at least one of a current speed of the vehicle, and a current acceleration of the vehicle.

The processor circuit may be operably configured to produce cost values for each of the engine fuel consumption cost and the storage element lifetime cost and to combine the cost values to produce an overall operating cost for each of the apportionments.

The processor circuit may be operably configured to combine the operating cost values by producing a sum of the operating cost values.

The processor circuit may include a memory operably configured to store information representing the plurality of engine fuel consumption costs therein and the processor circuit may be operably configured to locate an engine fuel consumption cost corresponding to each of the plurality of apportionments of the requested operating power in the memory.

The processor circuit may be operably configured to locate an engine fuel consumption cost corresponding to an engine torque and engine speed that satisfies each of the apportionments of the requested operating power.

The apparatus may include a temperature sensor located on the engine and operable to produce a signal representing an operating temperature of the engine and the processor circuit may be operably configured to locate an engine fuel consumption cost corresponding to the operating temperature from the plurality of engine fuel consumption costs.

The apparatus may include a fuel consumption sensor operable to produce a signal representing an actual fuel consumption of the engine while operating the vehicle and the processor circuit may be operably configured to update the fuel consumption information in accordance with the actual fuel consumption of the engine.

The fuel consumption cost may include a fuel consumption cost associated with operating the engine to supply the apportionment of power, and a fuel consumption cost associated with operating the engine to replace energy supplied by the storage element to operate the motor to supply the apportionment of power.

The processor circuit may be operably configured to produce a prediction of a quantity of electrical energy required to replace energy supplied by the storage element to operate the motor for each of the plurality of apportionments.

The processor circuit may include a memory operably configured to store information representing a plurality of engine fuel consumption costs and the processor circuit may be operably configured to locate, in the memory, an engine fuel consumption cost corresponding to a minimum engine fuel consumption for replacing the quantity of electrical energy supplied to the motor by the storage element.

The prediction of the quantity of electrical energy may include a prediction of a quantity of electrical energy associated with at least one of a discharge energy loss in the storage element when supplying the quantity of electrical energy to the motor, a motor energy loss when supplying the apportionment of the requested operating power to the vehicle, and a charging energy loss of the storage element when replacing the quantity of electrical energy in the storage element.

The storage element may have a desired state of charge and the processor circuit may be operably configured to produce a storage element lifetime cost proportional to an expected deviation from the desired state of charge associated with operating at each of the plurality of apportionments of the requested operating power.

The storage element may be operably configured to produce a state of charge signal representing a state of charge of the storage element and the processor circuit may be operably configured to receive the state of charge signal and to produce the lifetime cost in response to the state of charge signal, the lifetime cost being proportional to an absolute value of a difference between the apportionment and a quantity of power required to return the state of charge of the storage element to the desired state of charge.

The processor circuit may be operably configured to produce operating costs for apportionments that meet at least one constraint criteria associated with an engine maximum power capability, an engine maximum torque capability, a motor maximum power capability, a motor maximum torque capability, a motor maximum braking power capability, a motor maximum braking torque capability, a storage element maximum discharge power, and a storage element maximum charging power.

The processor circuit may be operably configured to select an apportionment having a minimum operating cost using a golden section search technique.

In accordance with another aspect of the invention there is provided a computer readable medium encoded with codes for directing a processor circuit to carry out a method for managing power in a hybrid vehicle, the vehicle including an engine, an electric motor, and an energy storage element coupled to the motor. The method involves receiving a request to supply operating power to drive the vehicle and responding to the request by selecting an apportionment of operating power between the engine and the motor from among a plurality of apportionments having respective operating costs such that the selected apportionment is associated with a minimum operating cost, the operating cost including at least an engine fuel consumption cost and a storage element lifetime cost. The method further involves causing power to be supplied by at least one of the engine and the motor in accordance with the selected apportionment.

In accordance with another aspect of the invention there is provided a computer readable signal encoded with codes for directing a processor circuit to carry out a method for managing power in a hybrid vehicle, the vehicle including an engine, an electric motor, and an energy storage element coupled to the motor. The method involves receiving a request to supply operating power to drive the vehicle and responding to the request selecting an apportionment of operating power between the engine and the motor from among a plurality of apportionments having respective operating costs such that the selected apportionment is associated with a minimum operating cost, the operating cost including at least an engine fuel consumption cost and a storage element lifetime cost. The method further involves causing power to be supplied by at least one of the engine and the motor in accordance with the selected apportionment.

In accordance with one aspect of the invention there is provided an apparatus for managing power in a hybrid vehicle, the vehicle including an engine, an electric motor, and an energy storage element coupled to the motor. The apparatus includes provisions for receiving a request to supply operating power to drive the vehicle and provisions for responding to the request by selecting an apportionment of operating power between the engine and the motor from among a plurality of apportionments having respective operating costs such that the selected apportionment is associated with a minimum operating cost, the operating cost including at least an engine fuel consumption cost and a storage element lifetime cost. The apparatus also includes provisions for causing power to be supplied by at least one of the engine and the motor in accordance with the selected apportionment.

The apparatus may include provisions for assigning a relative weighting between the engine fuel consumption cost and the storage element lifetime cost, the relative weighting assigned in accordance with fuel prices and storage element replacement prices.

The apparatus may include provisions for producing operating costs for each of the plurality of apportionments.

The motor may be operably configured to receive mechanical power and to generate electrical energy for charging the storage element, the mechanical power being produced while reducing or maintaining a speed of the vehicle and the apparatus may further include provisions for reducing the operating costs in proportion to a quantity of the electrical energy generated while reducing or maintaining the speed of the vehicle.

The provisions for causing power to be supplied may include provisions for producing an engine power control signal and a motor power control signal in response to at least one of a drive signal representing an operator requested power received from an operator input device and a current vehicle operating condition, the power control signals being operable to cause a least one of the engine and the motor to supply power in accordance with the selected apportionment.

The provisions for producing the power control signals may include provisions for producing power request signals in response to at least one of a current speed of the vehicle, and a current acceleration of the vehicle.

The provisions for producing the operating costs for the plurality of apportionments of the requested operating power may include provisions for producing cost values for each of the engine fuel consumption cost and the storage element lifetime cost and provisions for combining the cost values to produce an overall operating cost for each of the apportionments.

The provisions for combining the operating cost values may include provisions for producing a sum of the operating cost values.

The apparatus may include provisions for storing information representing the plurality of engine fuel consumption costs and the provisions for producing the operating costs may include provisions for locating an engine fuel consumption cost corresponding to each of the plurality of apportionments of the requested operating power.

The provisions for locating may include provisions for locating an engine fuel consumption cost corresponding to an engine torque and engine speed that satisfies each of the apportionments of the requested operating power.

The apparatus may include provisions for producing a signal representing an operating temperature of the engine and the provisions for locating may include provisions for locating an engine fuel consumption cost corresponding to the operating temperature.

The apparatus may include provisions for producing a signal representing an actual fuel consumption of the engine while operating the vehicle and provisions for updating the stored fuel consumption information in accordance with the actual fuel consumption of the engine.

The provisions for producing the operating costs may include provisions for producing a fuel consumption cost for each of the plurality of apportionments, the fuel consumption cost including a fuel consumption cost associated with operating the engine to supply the apportionment of power, and a fuel consumption cost associated with operating the engine to replace energy supplied by the storage element to operate the motor to supply the apportionment of power.

The provisions for producing the fuel consumption cost to replace energy supplied by the storage element may include provisions for producing a prediction of a quantity of electrical energy required to replace the energy supplied by the storage element.

The apparatus may include provisions for storing information representing a plurality of engine fuel consumption costs and the provisions for producing the fuel consumption cost to replace energy supplied by the storage element may include provisions for locating, in the provisions for storing information, an engine fuel consumption cost corresponding to a minimum engine fuel consumption for replacing the quantity of electrical energy supplied to the motor by the storage element.

The provisions for producing the prediction of the quantity of electrical energy may include provisions for predicting a quantity of electrical energy associated with at least one of a discharge energy loss in the storage element when supplying the quantity of electrical energy to the motor, a motor energy loss when supplying the apportionment of the requested operating power to the vehicle, and a charging energy loss of the storage element when replacing the quantity of electrical energy in the storage element.

The storage element may have a desired state of charge and the provisions for producing the operating costs may include provisions for producing a storage element lifetime cost proportional to an expected deviation from the desired state of charge associated with operating at each of the plurality of apportionments of the requested operating power.

The apparatus may include provisions for producing a state of charge signal representing a state of charge of the storage element, the lifetime cost for each apportionment being proportional to an absolute value of a difference between the apportionment and a quantity of power required to return the state of charge of the storage element to the desired state of charge.

The provisions for producing the operating costs for the plurality of apportionments of power may include provisions for producing operating costs for apportionments that meet at least one constraint criteria associated with an engine maximum power capability, an engine maximum torque capability, a motor maximum power capability, a motor maximum torque capability, a motor maximum braking power capability, a motor maximum braking torque capability, a storage element maximum discharge power, and a storage element maximum charging power.

The provisions for selecting the apportionment may include provisions for selecting an apportionment having a minimum operating cost using a golden section search technique.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
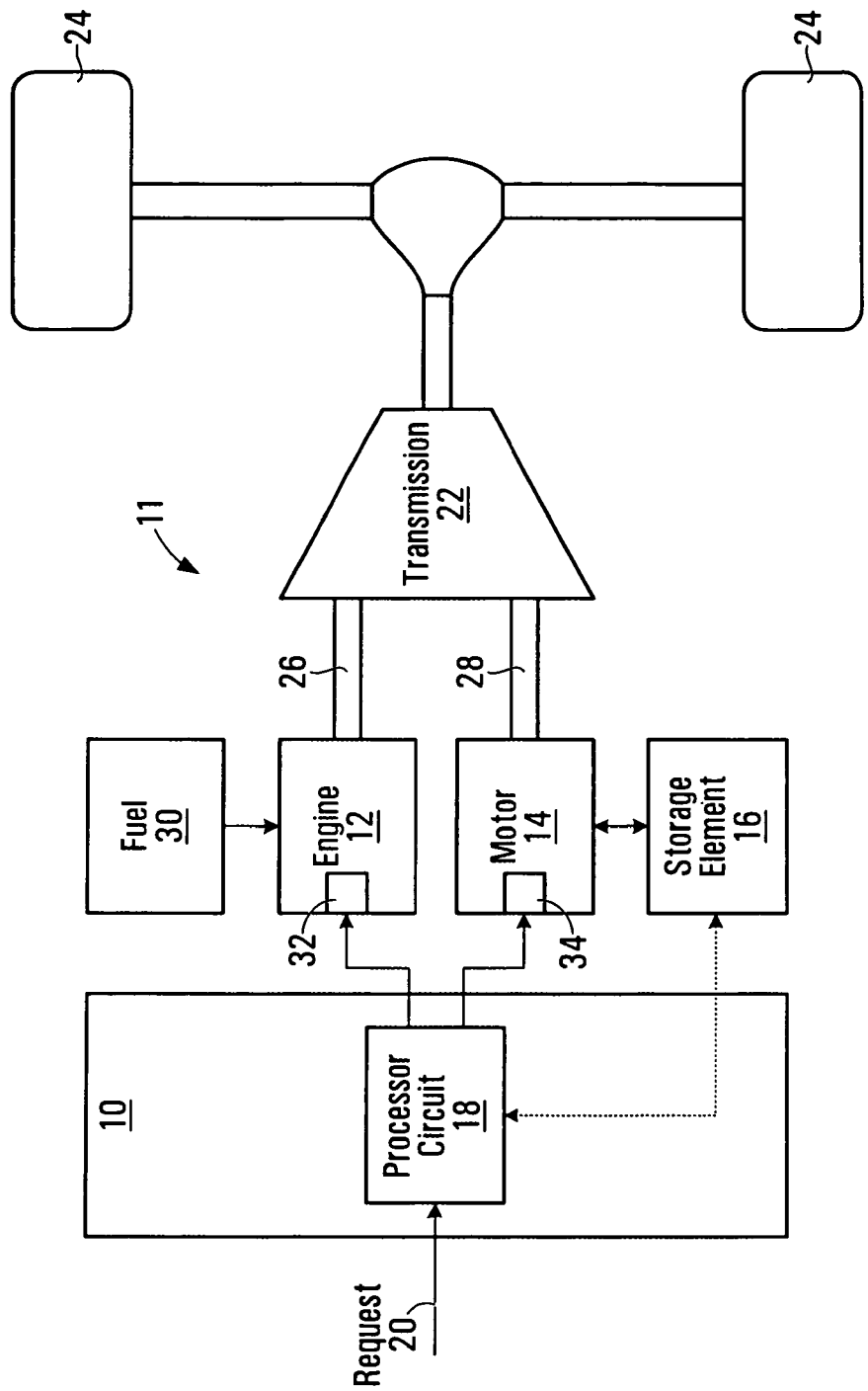
FIG. 1 is a schematic view of a hybrid vehicle in accordance with a first embodiment of the invention.

Referring to FIG. 1, an apparatus for managing power in a hybrid vehicle 11 is shown generally at 10. The hybrid vehicle 11 includes an engine 12, an electric motor-generator 14, and an energy storage element 16 coupled to the motor. The apparatus 10 includes a processor circuit 18, which is operably configured to receive a request signal 20 to supply operating power to drive the vehicle 11. The processor circuit 18 is operably configured to respond to the request by selecting an apportionment of operating power between the engine 12 and the motor-generator 14 from among a plurality of apportionments having respective operating costs such that the selected apportionment is associated with a minimum operating cost. The operating cost includes at least an engine fuel consumption cost and a storage element lifetime cost. The processor circuit 18 is operably configured to cause power to be supplied by at least one of the engine 12 and the motor-generator 14 in accordance with the selected apportionment.

In the hybrid vehicle 11 shown in FIG. 1, the vehicle includes a transmission 22 and a pair of drive wheels 24. The engine 12 is coupled to the transmission 22 through a first shaft 26, and the motor-generator 14 is coupled to the transmission via a second shaft 28. The first and second shafts 26 and 28 couple power from the engine 12 and the motor-generator 14 respectively, through the transmission 22, to the drive wheels 24, thus supplying operating power to drive the vehicle 11. In general operating power may be supplied by either the engine 12, or the motor-generator 14, or by the engine and the motor in combination.

The hybrid vehicle 11 also includes a fuel reservoir 30, which is in communication with the engine 12 for supplying fuel to operate the engine 12. The engine 12 further includes an interface 32 which is in communication with the processor circuit 18 for receiving an engine power control signal from the processor circuit 18 to control an amount of power coupled to the transmission 22 through the first shaft 26.

The storage element 16 is in communication with the motor-generator 14 for supplying electrical energy to the motor. The motor-generator 14 further includes an interface 34 for receiving a motor power control signal from the processor circuit 18 to control an amount of mechanical power supplied by the motor-generator 14 to the second shaft 28 and to control an amount of electrical power generated by the motor-generator in response to mechanical energy provided by the second shaft.

The motor-generator 14 thus has a motor mode in which it converts energy from the storage element 16 into mechanical energy at the second shaft 28 and a generator mode in which it receives mechanical power from the second shaft and converts it into electrical energy for storage in the storage element 16. Alternatively, in other embodiments (not shown) the vehicle 11 may include a separate generator for charging the storage element 16, in which case the motor-generator 14 would operate only in the motor-mode.

The mechanical power provided by the second shaft 28 may be generated by the drive wheels 24 while maintaining or reducing a speed of the vehicle 11, and coupled through the transmission 22 to the second shaft 28. Alternatively, the mechanical power may be generated by the engine 12, coupled through the first shaft 26 to the transmission 22, which may be configured to couple the power to the second shaft 28.

Figure 2:
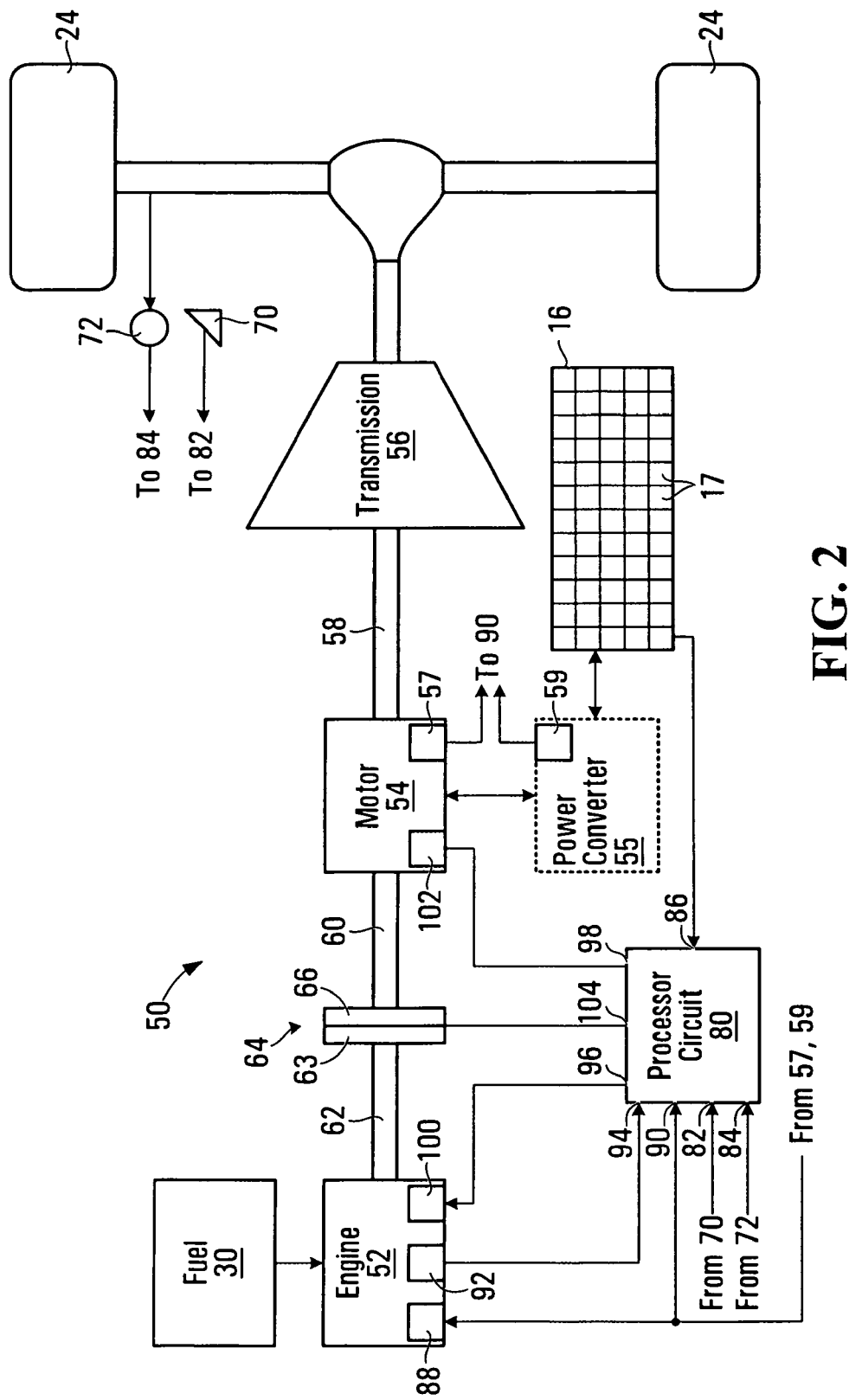
FIG. 2 is a schematic view of a hybrid vehicle in accordance with a second embodiment of the invention.

Referring to FIG. 2, an alternative embodiment of a hybrid vehicle is shown generally at 50. The hybrid vehicle 50 includes an engine 52, an electric motor-generator 54, a transmission 56, and a clutch 64. The clutch 64 includes a first friction disk 66 and a second friction disk 63. The clutch 64 is engaged by causing the friction disks 66 and 63 to be brought into contact with each other and the clutch is disengaged by causing the friction disks to be separated.

The hybrid vehicle 50 includes a first shaft 58 for coupling the motor-generator 54 to the transmission 56, and a second shaft 60 for coupling the motor to the first friction disk 66 of the clutch 64. The second shaft 60 and the first shaft 58 are coupled to opposite ends of a rotor (not shown) in the motor-generator 54 such that power may be coupled between the first and second shafts 60 and 58, through the motor-generator 54. The hybrid vehicle 50 also includes a third shaft 62 for coupling the engine 52 to the second friction disk 63 of the clutch 64. The clutch 64 operates to cause the engine 52 to be selectively engaged or disengaged from the second shaft 60. In some embodiments (not shown) the motor-generator 54 may be located between the transmission 56 and the drive wheels 24, and the motor may be coupled to supply and receive power directly to or from the drive wheels.

The motor-generator 54 is in communication with the storage element 16 for receiving electrical energy therefrom. The storage element 16 may comprise a plurality of cells 17, and may further include circuitry (not shown) for generating a state of charge (SOC) signal indicating a current SOC of the storage element. In one embodiment, the cells 17 in the storage element may include electrochemical cells 17, such as nickel metal hydride (NiMH) storage cells. In other embodiments, the storage element 16 may include a combination of electrochemical cells and/or a storage capacitor element, such as ultra-capacitor, for example.

In the embodiment shown the motor-generator 54 comprises a wound field direct current (DC) motor in which a magnetic field is provided by energizing field coils (not shown). The field coils may be energized using electrical energy supplied from the storage element 16. In other embodiments the motor may include a permanent magnet DC motor, or an alternating current motor (AC). In general the motor-generator 54 is operable to couple mechanical power to the first shaft 58 when receiving electrical energy from the storage element 16, and is operable as a generator when mechanical power is coupled to the motor through the first shaft 58 for generating electrical energy for charging the storage element 16.

The hybrid vehicle 50 optionally includes a power converter 55 for converting the electrical energy received from the storage element into a form suitable for operating the motor-generator 54. For example, the power converter 55 may include an inverter for converting direct current (DC) from the storage element 16 into alternating current (AC) for operating an AC motor. Alternatively the power converter 55 may be a DC-DC converter for converting the DC current from a first voltage level associated with the storage element 16, to a second voltage level suitable for operating the motor.

In this embodiment, the hybrid vehicle 50 further includes an operator input device 70 for producing a drive signal representing an operator requested power. The operator input device may include a foot actuated actuator, for example. The hybrid vehicle 50 also includes a speed sensor 72 which is in communication with the drive wheels 24 for producing a speed signal representing a speed of the drive wheels 24.

Figure 3:
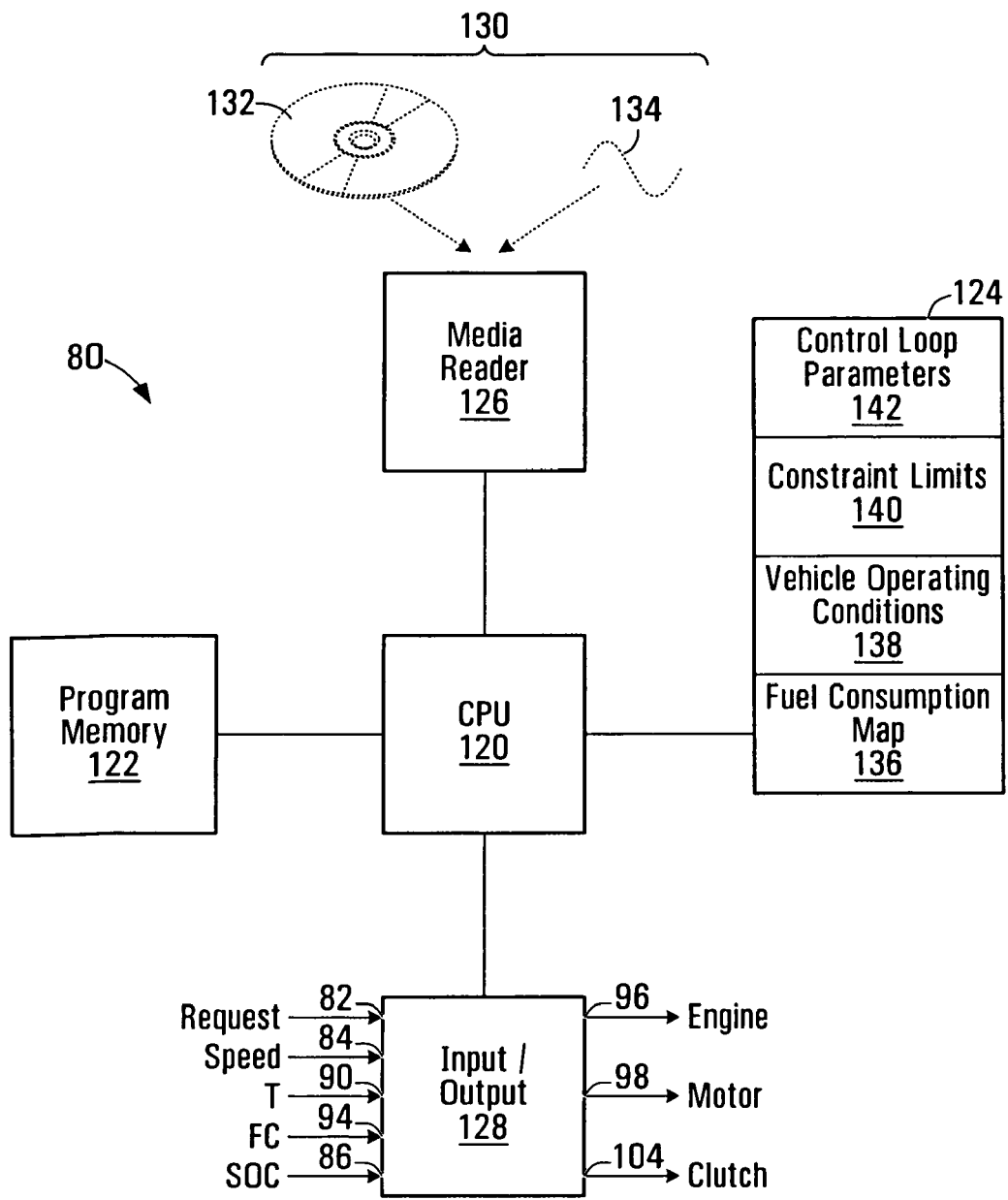
FIG. 3 is a schematic view of a processor circuit for use in the hybrid vehicle shown in FIG. 2.

An embodiment of a processor circuit for managing power in the hybrid vehicle 50 is shown at 80 in FIG. 3. Referring to FIG. 3, the processor circuit 80 includes a central processing unit (CPU) 120, a program memory a parameter memory 124, a media reader 126, and an input/output port (I/O) 128. The program memory 122, the parameter memory 124, the media reader 126 and the I/O 128, are all in communication with the CPU 120.

The I/O 128 includes an input 82 for receiving a request signal, an input 84 for receiving a speed signal, an input 90 for receiving temperature signals, an input 94 for receiving a fuel consumption signal, and an input 86 for receiving the SOC signal form the storage element 16. The I/O 128 also includes the output 96 for producing an engine power control signal, an output 98 for producing a motor power control signal, and an output 104 for producing a clutch control signal.

The media reader 126 facilitates loading program codes into the program memory 122 from a computer readable medium 130, such as a CD-ROM disc 132, or a computer readable signal 134, such as may be received from a network such as a telephone network or the Internet, for example.

The parameter memory 124 includes a store 136 for storing data representing an engine fuel consumption map, a store 138 for storing data representing a set of operating conditions of the hybrid vehicle 50, a store 140 for storing data representing constraint limits for the vehicle, and a store 142 for storing control loop parameters.

The input 82 of the processor circuit is in communication with the operator input device 70 for receiving the drive signal, the input 84 is in communication with the speed sensor 72 for receiving the speed signal, and the input 86 is in communication with the storage element 16 for receiving the SOC signal.

Referring back to FIG. 2, in this embodiment, the engine 52 also includes a temperature sensor 88 for sensing an operating temperature of the engine, the motor-generator 54 includes a temperature sensor 57 for sensing an operating temperature of the motor, and the power converter 55 includes a temperature sensor 59 for sensing an operating temperature of the power converter. The input 90 of the processor circuit 80 is in communication with the temperature sensors 88, 57, and 59 for receiving the respective temperature signals.

The engine 52 further includes a fuel consumption sensor 92 for generating a signal representing an actual fuel consumption of the engine. The input 94 of the processor circuit 80 is in communication with the fuel consumption sensor 92 for receiving the fuel consumption signal. Fuel is supplied to the engine 52 from the fuel reservoir 30.

The engine 52 also includes an interface 100 in communication with the output 96 of the processor circuit 80 for receiving the engine power control signal to control an amount of power coupled to the third shaft 62.

The motor-generator 54 includes an interface 102 in communication with the output 98 of the processor circuit for receiving the motor power control signal for controlling an amount of mechanical power supplied by the motor-generator 54 to the first shaft 58 and to control an amount of electrical power generated by the motor-generator in response to mechanical energy provided by the first shaft.

The clutch 64 is in communication with the output 104 of the processor circuit 80 for receiving the clutch control signal. The clutch control signal has states representing engagement and disengagement of the friction disks 63 and 66.

Operation

In the embodiment shown in FIG. 2, operating power is supplied to the drive wheels 24 of the hybrid vehicle 50 through the transmission 56. When the clutch control signal is in the disengaged state, the engine is decoupled from the second shaft 60 (and thus the first shaft 58), and the motor-generator 54 supplies operating power to the vehicle. The motor-generator 54 receives electrical energy from the storage element 16 and produces operating power for the vehicle 50 in response to the motor power control signal received at the interface 102 from the output 98 the processor circuit 80.

When the clutch control signal is in the engaged state, the engine 52 produces a first portion of the operating power in response to the engine power control signal received at the interface 100 from the processor circuit 80, while the motor-generator 54 produces a second portion of the operating power in response to the motor power control signal received at the interface 102 from the processor circuit 80.

When the motor power control signal causes the motor-generator 54 to cease producing power, operating power may be supplied by the engine 52, in which case no electrical energy is supplied to the motor (or to the motor field coils) from the storage element 16 and the motor rotates freely, consuming only a small amount of energy due to residual magnetism and windage effects (i.e. when the motor is not operating as a generator).

When it is desired to charge the storage element 16, power is coupled to the motor-generator 54 through the first shaft 58. The power is supplied either by the engine 52 or by the drive wheels 24. The drive wheels 24 provide power to the first shaft 58 while reducing or maintaining the speed of the vehicle 50. For example, when traveling downhill at a constant velocity, the power from the drive wheels may be coupled back to the motor-generator 54 for generating electrical energy, thus reducing an amount of conventional frictional braking required to operate the vehicle. When the field coils of the motor-generator 54 are energized, the motor acts as an electrical energy generator for converting power on the first shaft 58 to electrical power for charging the storage element 16. The torque required at the first shaft 58 to generate the electrical energy acts as a braking force on the drive wheels 24.

In other embodiments where the motor-generator 54 comprises, for example, a permanent magnet field DC motor, operation as a generator is contingent on whether or not current is drawn from the motor while the motor is receiving mechanical power. In such cases the power converter 55 may be configured to enable or disable drawing of a charging current to charge the storage element 16 depending on whether braking is required.

In general, in the hybrid vehicle embodiments shown in FIG. 1 and FIG. 2, the required operating power may be apportioned between the motor and the engine respectively, such that the motor supplies the first portion of the operating power and the engine supplies the second portion of the operating power. Advantageously the apportionment of power between the motor and the engine facilitates operation of the hybrid vehicles 11 and 50 such that a cost of operating the vehicles may be minimized.

In accordance with one embodiment of the invention, minimizing the operating cost involves producing operating costs for a plurality of apportionments of a requested operating power between the engine 52 and the motor-generator 54 and selecting an apportionment from the plurality of apportionments corresponding to a minimum operating cost. The processor circuit 80 then produces the engine power control signal at the output 96 and motor power control signal at the output 98 in accordance with the selected apportionment.

The selected apportionment of power is applied for a control period, after which the process is repeated for successive control periods, thus responding to operating changes on an ongoing basis. When the apportionment of power results in no power being supplied by the engine 52, the processor circuit 80 may cause the clutch control signal to assume the disengaged state causing the clutch 64 to be disengaged, thus allowing the engine to be stopped such that fuel is conserved. When required the engine 52 may be restarted by engaging the clutch 64 to couple power to the third shaft 62, thus starting the engine.

Engine Operating Costs

Still referring to FIG. 2, the cost of operating the engine 52 to supply a quantity of operating power to the vehicle is related to an amount of fuel consumed from the fuel reservoir 30. The engine 52 may be configured to run on one or more of a variety of fuel supplies, including but not limited to, gasoline, diesel, biogas or other bio-fuels including cellulosic and other ethanols, propane, etc.

Figure 4:
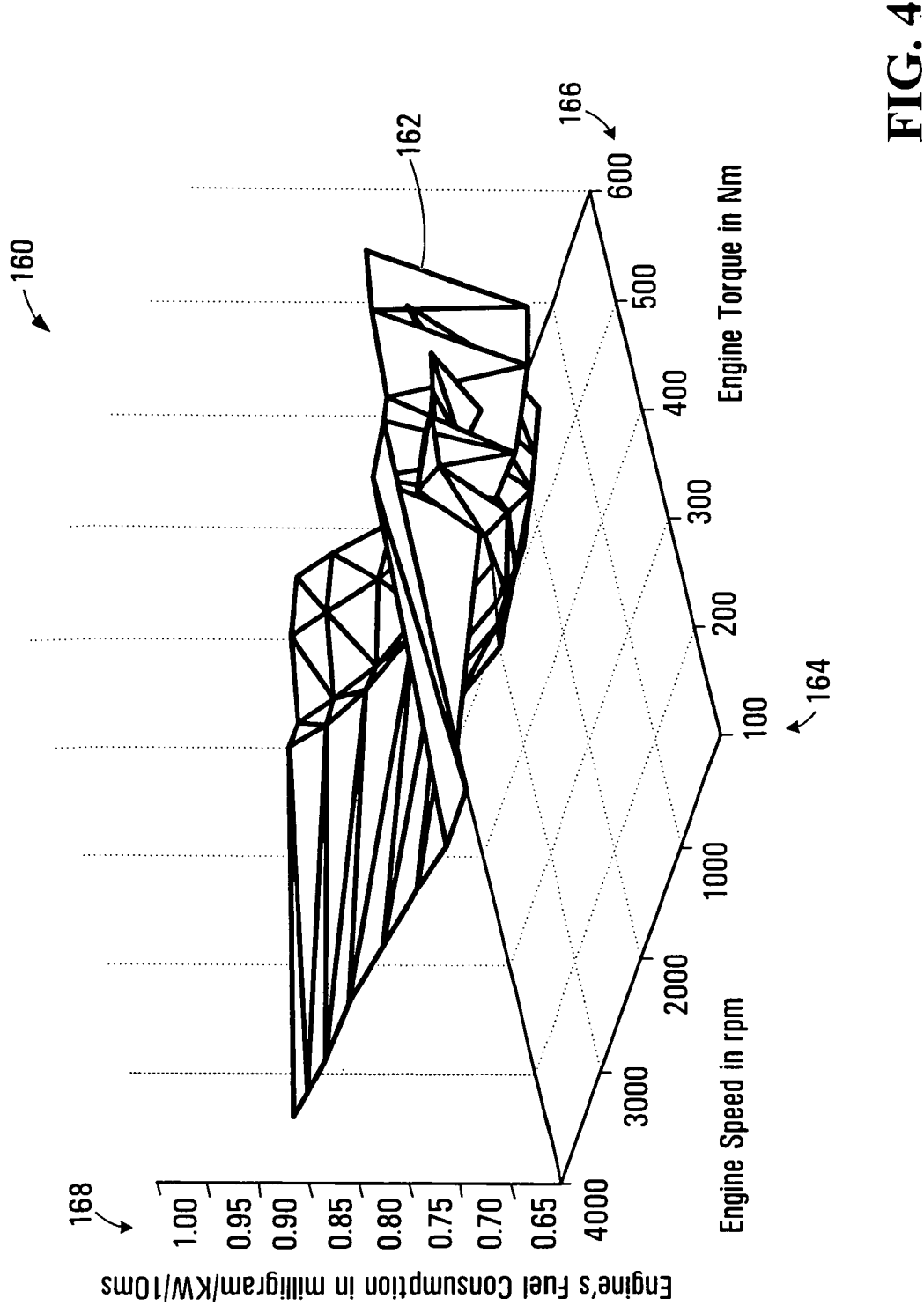
FIG. 4 is a graphical depiction of a fuel consumption map for an engine used in the hybrid vehicle shown in FIG. 2.

Referring to FIG. 4, a graphical depiction of a fuel consumption map for the engine 52 is shown generally at 160. The map 160 includes a surface function 162 which relates engine speed values 164 and engine torque values 166 to fuel consumption values 168. Each pairing of a specific engine speed value 164 and an engine torque value 166 represents a power supplied by the engine 52 (Power=Torque×speed). In general, data representing the map 160 is stored in the store 136 in the parameter memory 124 of the processor circuit 80. The data may be stored as a look up table or a set of coefficients for a function defining the surface 162.

In the embodiment shown in FIG. 2, the fuel consumption data stored in the store 136 is updated with actual fuel consumption values produced by the fuel consumption sensor 92 and received at the input 94 of the I/O 128. In other embodiments, where a fuel consumption sensor is not included, the fuel consumption data stored in the store 136 may be determined from test data for the engine 52, or from standard test data for engines similar to the engine 52.

Fuel consumption is also generally dependent on engine temperature. In the embodiment shown, the effect of engine temperature on fuel consumption is taken into account by storing a cold engine temperature fuel consumption map and a hot engine temperature fuel consumption map in the store 136 of the parameter memory 124. The temperature signal from the temperature sensor 88 is received at the input 90 of the I/O 128 and the actual engine temperature is used to interpolate between the hot and cold fuel consumption values to obtain a temperature corrected fuel consumption value.

In this embodiment, the engine operating cost is calculated from the following equation:

$$OC_{eng} = Fuel_{eng} \cdot Power_{eng} \qquad \text{Eqn 1}$$

where $OC_{eng}$ is the operating cost of the engine, $Power_{eng}$ is an apportionment of power to be supplied by the engine 52 and $Fuel_{eng}$ is the fuel consumption value corresponding to the apportionment of power.

Motor Operating Costs

Electrical energy for operating the motor-generator 54 is supplied from the storage element 16. In general, the cost of operating the motor-generator 54 may be related to the cost of replacing energy supplied from the storage element 16. Electrical energy supplied from the storage element 16 may be replaced by coupling regenerative braking power from the drive wheels 24 to the motor-generator 54, or by coupling mechanical power supplied by the engine 52 to the motor-generator 54, to generate electrical energy for charging the storage element.

In this embodiment the motor operating cost is calculated from the following equation:

$$OC_{mot} = Fuel_{equ} \cdot Power_{mot} \qquad \text{Eqn 2}$$

where $OC_{mot}$ is the operating cost of the motor, $Power_{mot}$ is the apportionment of power to be supplied by the motor and $Fuel_{equ}$ is an equivalent fuel consumption amount that will be required by the engine 52 to replace the quantity of energy in the storage element 16 in a future control period.

In this embodiment $Fuel_{equ}$ is calculated taking into account the lowest fuel consumption rate (from the map shown in FIG. 4) and the electrical losses (or efficiencies) in the storage element 16 and the motor-generator 54 as follows:

$$Fuel_{equ} = \frac{Min(Fuel_{eng}) - Fuel_{free\_brake}}{\eta_{mot} \cdot \eta_{store}} \qquad \text{Eqn 3}$$

where $Fuel_{free\_brake}$ is an amount of energy received from regenerative braking of the vehicle 50 during a prior control period, expressed as an equivalent fuel consumption, $\eta_{mot}$ is the electrical efficiency of the motor-generator 54, and $\eta_{store}$ is the charging efficiency of the storage element.

In general, the quantity of the energy available from regenerative braking will vary in accordance with driving habits of the vehicle operator, road and environmental conditions etc. Accordingly, in this embodiment the quantity of energy is calculated in real time using the following equation:

$$E_{free\_brake} = \frac{1}{T} \int_0^T Power_{free\_brake} \, dt \qquad \text{Eqn 4}$$

where T is a control loop repetition time and $Power_{free\_brake}$ is the instantaneous regenerative braking power available at any time t. The regenerative braking energy calculated in Eqn 4 is available for use during the next control period. The quantity $E_{free\_brake}$ may be converted into an equivalent fuel consumption $Fuel_{free\_brake}$ using standard values for the potential energy per unit mass for the fuel type contained in the fuel reservoir 30.

In general, the fuel consumption of the engine 52 thus includes a first component related to supplying a portion of operating power to the drive wheels 24 from the engine, and a second component, which is attributed to the motor-generator 54, for supplying power to the motor in order to charge the storage element 16 to replace energy discharged therefrom in a previous control period.

Storage Element Lifetime Cost

Commonly available storage elements have an associated lifetime, after which the element becomes unsuitable for further use. For some storage elements, such as NiMH batteries, this lifetime may be prolonged by operating the element as close as possible to an optimal state of charge (SOC), for example at 60% of full capacity. Advantageously, operating the storage element 16 at close to optimal SOC results in a longer lifetime and thus the lowest storage element lifetime cost.

Figure 5:
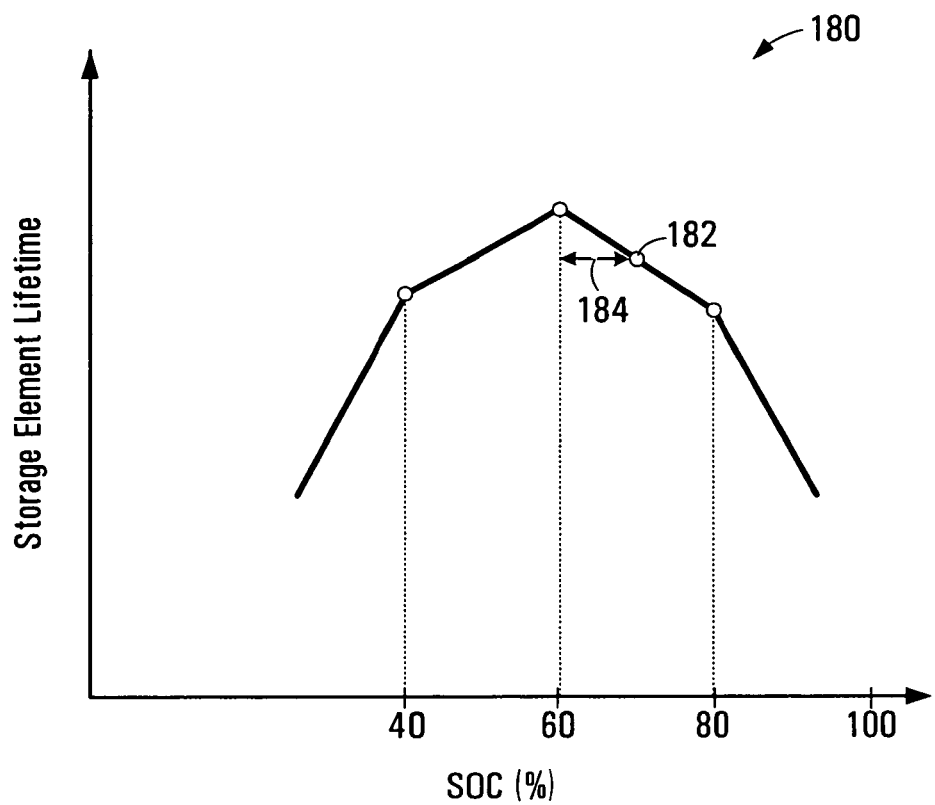
FIG. 5 is a graphical depiction of a storage element lifetime as a function of state of charge, for a storage element used in the hybrid vehicle shown in FIG. 2.

Referring to FIG. 5 a graphical depiction of an exemplary NiMH storage element lifetime as a function of SOC is shown generally at 180. In this example, the longest lifetime is achieved by maintaining the battery SOC at 60%. Any deviation from 60% SOC results in a storage element lifetime penalty or reduction. In practice, it is difficult to maintain a storage element at or very near the optimal SOC at all times, and the storage element is generally operated over a range of SOC values, for example from 40% SOC to 80% SOC for a NiMH storage element.

Whenever electrical energy is supplied from the storage element (discharging), or supplied to the storage element (charging), the resulting SOC of the storage element will change. In any control period, if the electrical energy supplied results in the SOC moving away from the optimal SOC there is an associated lifetime penalty or operating cost which in this embodiment is expressed as:

$$OC_{storage} = W_s \cdot |K \cdot \Delta SOC - Power_{mot}| \qquad \text{Eqn 5}$$

where K is a calibration parameter for relating an SOC difference to a power required to bring the SOC to the storage element 16 back to optimal SOC, and $W_s$ is a weighting factor. The weighting factor $W_s$ may be used to account for the relative cost of fuel versus the relative cost of storage element replacement. For example, if fuel prices drop the weighting factor $W_s$ may be increased to accord greater weight to the storage element operating costs, while if storage element replacement prices drop, the weighting $W_s$ may be reduced to accord less weight to the storage element operating costs.

For example, referring to FIG. 5, if at the beginning of the control period the SOC is at a point 182 (corresponding to a SOC of approximately 70%), then the ΔSOC (shown by the arrow 184) is −10%. Assuming that K=1000 W per % SOC, the required power to return to optimal SOC is −10000 W (the negative sign indicates a discharge of the storage element 16 is required). For a motor power apportionment of 10000 W, the operating cost calculated from Eqn 5 is thus zero, since discharging 10000 W from the storage element causes the SOC to be at optimal SOC. Lower or higher motor power apportionments will result in positive storage element operating costs since the SOC will not be at optimal SOC at the end of the control period.

Overall Operating Cost

The overall operating cost function is obtained by summing the engine operating cost, the motor operating cost and the storage element operating cost i.e:

$$OC = OC_{eng} + OC_{mot} + OC_{storage} \qquad \text{Eqn 6}$$

where OC is the overall operating cost. In general the overall operating cost function is evaluated for each of a plurality of apportionments of power between the engine 52 and the motor-generator 54 and the power apportionment corresponding to a minimum operating cost is selected. The plurality of apportionments are identified by evaluating operational constraints associated with the engine 52, the motor-generator 54, and the storage element 16 prior to each control period, such that power apportionments that do not meet the constraints are not considered. Some of the constraints may be set by the manufacturer (e.g. maximum storage element temperature, maxim terminal voltage, and/or minimum terminal voltage), however in general the constraints also depend on the current operating conditions of the vehicle.

The engine 52 has a constraint related to the maximum power that may be supplied, which is a function of the engine speed and torque. Accordingly, an apportionment which results in an engine torque or speed that is greater than the corresponding maximum is not further considered.

The motor-generator 54 also has a constraint related to the maximum mechanical power that may be supplied which may be expressed as a function of motor temperature, motor current, motor voltage, motor speed and motor torque. When regenerative braking power is available, the motor-generator 54 has a further constraint related to the maximum mechanical power that may be received by the motor, which is a function of motor temperature, motor current, motor voltage, motor speed and motor torque.

Another constraint for the motor-generator 54 occurs when a power apportionment to the motor will result in overcharging of the storage element (i.e. the resulting SOC at the end of the control period would be above the maximum SOC recommended by the storage element manufacturer). Similarly, a constraint for the motor-generator 54 occurs when a motor power apportionment will result in discharging the storage element 16 beyond a minimum SOC set by the manufacturer.

Any motor power apportionment that exceeds any of the motor constraints is not further considered.

The storage element 16 generally has constraints related to maximum charging power and maximum discharging power. For example, the maximum charging power constraint for an NiMH battery is a function of battery temperature, SOC, the terminal voltage of the battery, maximum terminal voltage, and maximum charging current. In general the maximum changing power varies from control period to control period depending on the aforementioned factors.

Similarly, the maximum discharging power for a NiMH battery is a function of battery temperature, SOC, the terminal voltage of the battery, minimum terminal voltage, and maximum discharging current.

Accordingly, an apportionment which exceeds any of the storage element charging or discharging constraints is not further considered.

Control Loop

Figure 6:
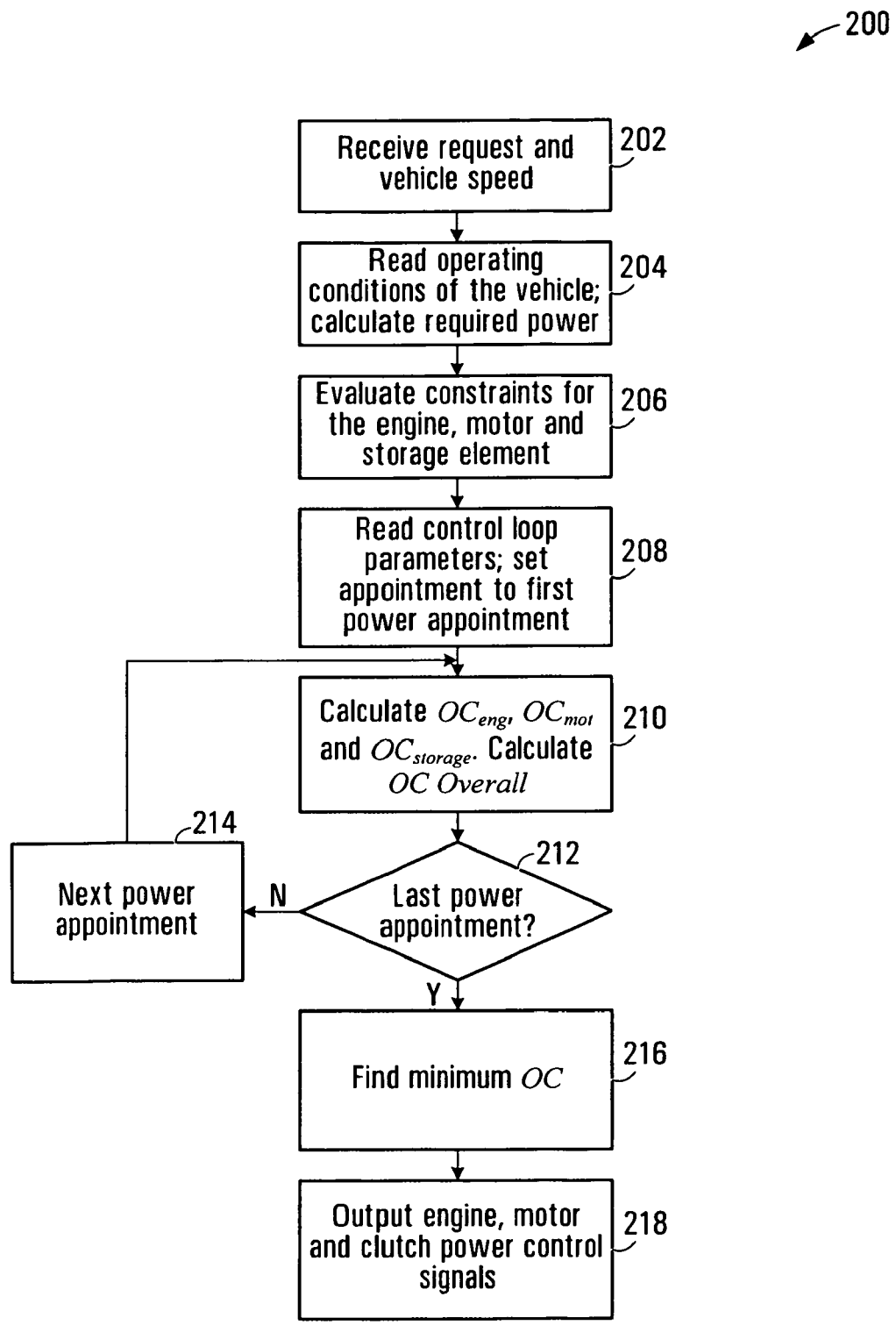
FIG. 6 is a flowchart of a process for producing operating costs executed by the processor circuit shown in FIG. 3.

Referring to FIG. 6, a flow chart depicting blocks of code for directing the processor circuit 80 (shown in FIG. 2) to manage power in the hybrid vehicle 50, is shown generally at 200. The blocks generally represent codes that may be read from the computer readable medium 130, and stored in the program memory 122, for directing the CPU 120 to perform various functions related to managing apportionment of power in the vehicle 50. The actual code to implement each block may be written in any suitable program language, such as C, C++ and/or assembly code, for example.

The process begins with a first block of codes 202 which directs the processor circuit 80 to receive the drive signal from the operator input device at the input 82 and to receive the speed from the speed sensor 72 at the input 84 of the I/O 128.

The process continues at block 204, which directs the CPU 120 to read a current set of operating conditions of the hybrid vehicle 50 from the store 138 in the parameter memory 124. The current operating conditions generally include, for example, conditions such as speed and torque of the engine 52 and the motor-generator 54, SOC & terminal voltage of the storage element 16, temperatures of the engine, motor, power converter 55, and storage element, etc. The block 204 may also include codes for directing the processor to calculate a current vehicle acceleration from the speed values.

Block 204 further directs the processor circuit 80 to calculate an amount of operating power to be supplied to drive the vehicle 50 for the next control loop period. The amount of operating power to be supplied is calculated in response to the drive signal received from the operator input device 70 and the current operating conditions of the vehicle. Accordingly, the amount of operating power to be supplied may not meet the operator requested power, depending on current operating conditions of the vehicle 50. For example, if the engine 52 and motor-generator 54 are already delivering maximum power, a request received from the operator input device 70 to supply more power will not be met.

The process continues at block 206 which directs the processor circuit 80 to evaluate operating constraints for the next control loop period for the engine 52, motor-generator 54, and storage element 16. The constraints are evaluated based on operating conditions read at block 204. Block 206 may further direct the processor circuit 80 to read constraint limits from the store 140 in the parameter memory 124, which may include manufacturer and/or other constraint information for the engine 52, the motor-generator 54 and/or the storage element 16.

The process continues at block 208 which directs the processor circuit 80 to read control loop parameters from the store 142 in the parameter memory 124. The control loop parameters may include, for example, a power increment value which determines the number of different apportionments of power that will be evaluated. Evaluating a greater number of apportionments may provide more precise apportionments, but since the operating costs are evaluated in real time while operating the vehicle, evaluating a large number of apportionments may require provision of faster processing speed for the processor circuit 80. Block 208 further directs the processor circuit to initialize a power apportionment variable to a first power apportionment.

Block 210 then directs the processor circuit to calculate the operating costs for the engine 52, motor-generator 54, and storage element 16 for the first power apportionment.

At block 212, if the present power apportionment is not the last power apportionment, the process continues at block 214, where the power apportionment variable is set to the next power apportionment. Blocks 210, 212 and 214 are then repeated for successive power apportionments.

Figure 7:
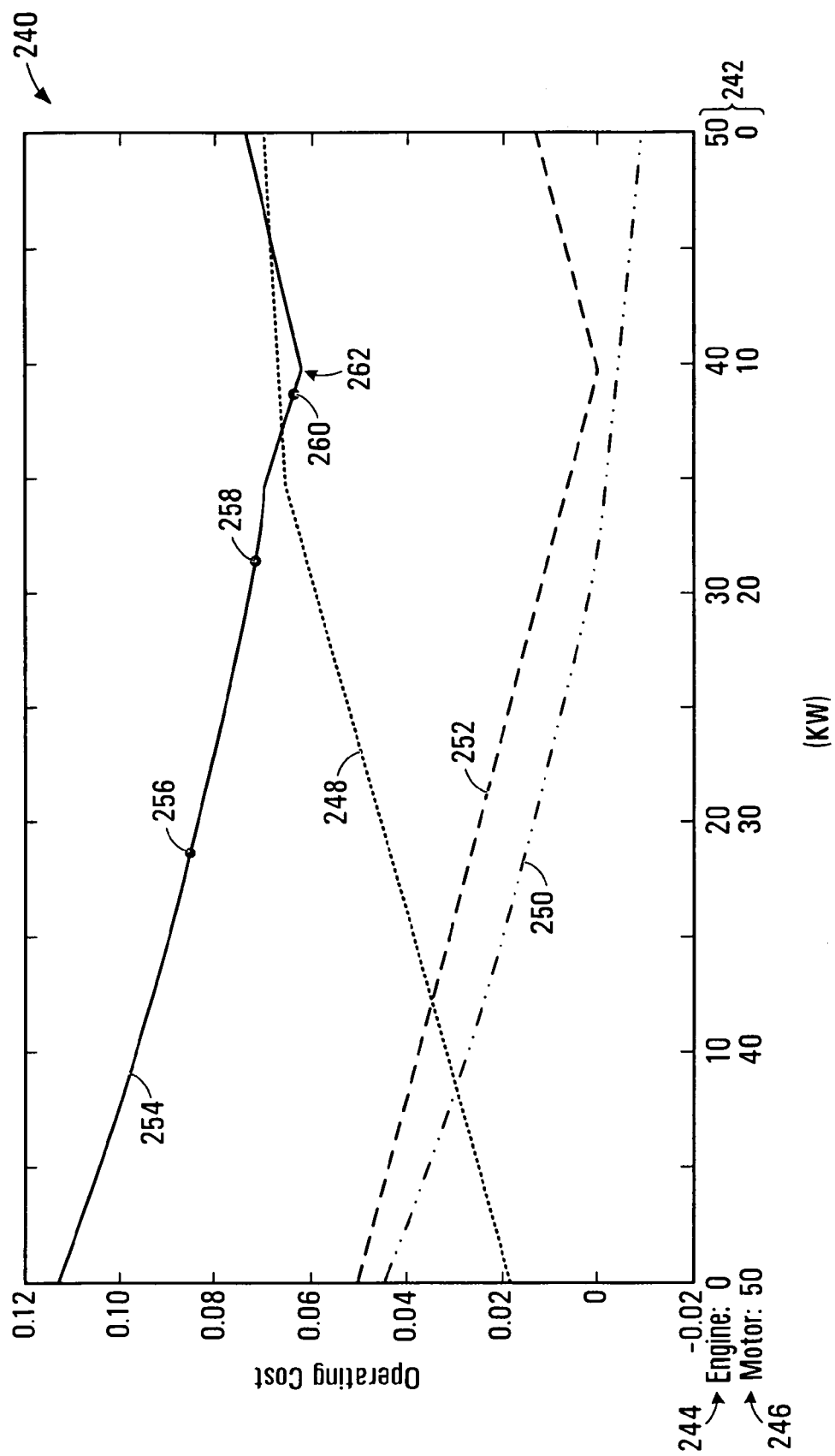
FIG. 7 is a graphical depiction of operating costs for the hybrid vehicle shown in FIG. 2.

Referring to FIG. 7, a graphical depiction of the operating costs for apportionment of a required power of 50 kW is shown generally at 200. Power apportionments are plotted on the x-axis as pairs of power apportionments 242, each pair including an engine power apportionment 244 and a motor power apportionment 246. A curve 248 represents the engine operating cost calculated in accordance with Eqn 1 for the power apportionments, a curve 250 represents motor operating costs calculated in accordance with Eqn 2, and *a curve 252 represents storage element lifetime costs calculated in accordance with Eqn 5. A curve 254 represents the overall operating cost function calculated in accordance with Eqn 6, for each power apportionment 242. In the example shown in FIG. 7, for simplicity it is assumed that no regenerative braking energy is available for the control period in question.

Referring back to FIG. 6, if at block 212 the power apportionment is the last power apportionment then the process continues at block 216.

At block 216 the processor circuit is directed to execute an optimization search to find an apportionment 242 corresponding to the minimum operating cost in the curve 254. In this embodiment, a golden section search is used to find the minimum operating cost. The golden section search is a bracketing technique, which may be applied to a set of values to find a single minimum value in the set between an upper bound bracket value and a lower bound bracket value. The search begins by selecting upper and lower bound brackets at end points of the range of power apportionments 242. The upper and lower bound brackets are then successively narrowed until a minimum is found. The technique derives its name from the golden ratio, which has been found to be an effective bracketing ratio. Applying the golden ratio involves selecting an intermediate apportionment between the upper bound bracket and the lower bound bracket that is 0.38197 from one end and 0.61803 from the other end, and then moving the bracket having a greater corresponding operating cost (curve 254) to the intermediate apportionment, which then becomes the new upper or lower bound bracket. The process is then repeated until the minimum operating cost value coincides with either the upper bound bracket or the lower bound bracket, in which case the lesser of the cost values corresponding to the upper and lower bound brackets is the minimum operating cost value.

The application of the golden section search technique to finding the minimum operating cost is described with reference to FIG. 7, by assuming that the number of apportionments is six (i.e the apportionments [0,50], [10,40], [20,30], [30,20], [40,10], and [50,0]). The first step in the application of the technique is to select apportionment pair [0,50] as the lower bound bracket and [50,0] as the upper bound bracket, and to calculate an intermediate point 256 between the upper bound bracket and the lower bound bracket using the golden section ratio of 0.38197, yielding an intermediate apportionment of [20,30], which is closest to the ratio 0.38197. Since the operating cost value at [20,30] is approximately 0.082, which is smaller than the operating cost values at [0,50] and [50,0], a new lower bound bracket of [20,30] is selected. Using the new lower bound bracket of [20,30] and the upper bound bracket of [50,0], the golden ratio is again applied to find an intermediate point 258, which in this case is closest to the apportionment [30,20] with an operating cost value of approximately 0.066. The lower bound bracket [20,30] has a higher cost value and accordingly, the new lower bound bracket is chosen at [30,20]. Selecting a further intermediate point in accordance with the golden ratio yields an intermediate point 260, which is close to apportionment [40,10]. Because there are no further intermediate values between the [40,10] lower bracket value and the [50,0] upper bound bracket value, the minimum of these two values represents the minimum operating cost at 262, which in this case is approximately 0.061 and corresponds to an apportionment of [40,10].

Advantageously, when the number of possible power apportionments is large, the golden section search allows quick convergence on a minimum value in a plurality of values having a single minimum between an upper bound and a lower bound. In other embodiments alternative optimization techniques, such as a linear search, for example may be used to find the minimum operating cost.

Referring back to FIG. 6, the process continues at block 218, which directs the processor circuit to cause the engine power control signal and the motor power control signal to be generated at respective outputs 96 and 98 of the I/O 128. In this case the engine supplies 40 kW of power and the motor supplies 10 kW, and thus the processor circuit 80 also causes the clutch control signal to be produced at the output 104 to cause the clutch 64 to be engaged such that the engine is coupled to the second shaft 60.

Advantageously, including a storage element lifetime cost and fuel consumption costs in selecting the apportionment of power between the engine and the motor facilitates operation of the vehicle such that fuel consumption is reduced without reducing the lifetime of the battery.

Figure 8:
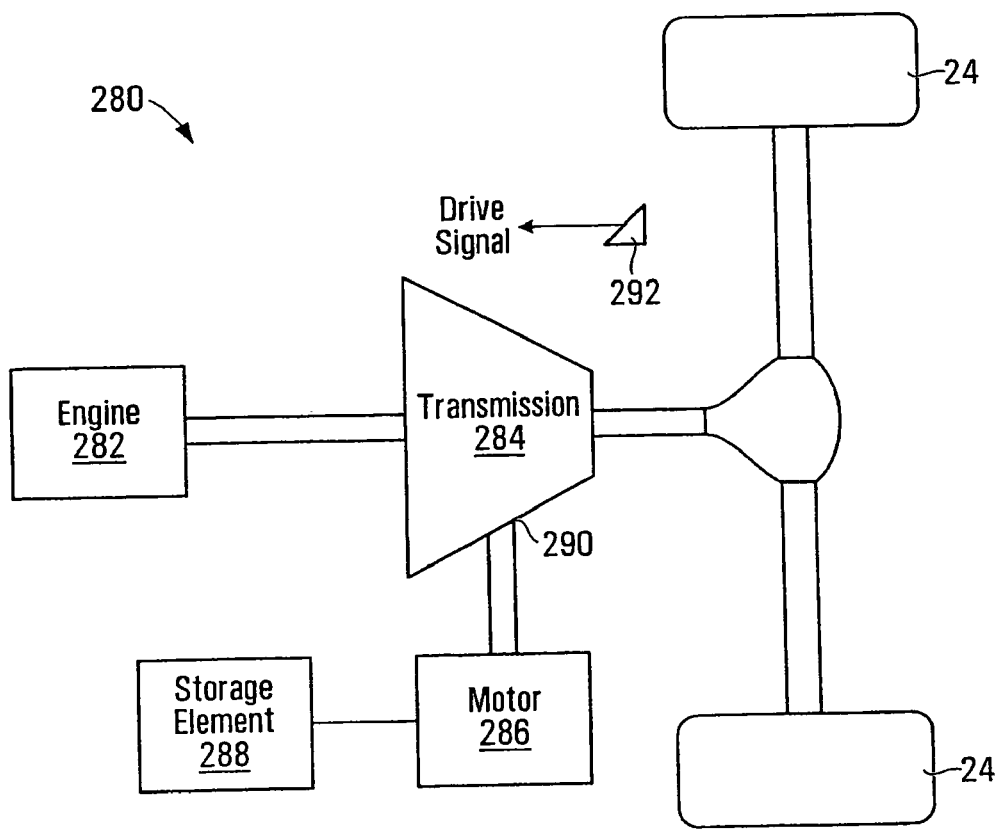
FIG. 8 is a schematic view of a hybrid vehicle in accordance with an alternate embodiment of the invention.

Referring to FIG. 8, an alternative embodiment of a hybrid vehicle is shown generally at 280. The hybrid vehicle 280 includes an engine 282, a transmission 284, a motor 286, and a storage element 288. The engine 282 is coupled to the drive wheels 24 through the transmission 284. In this embodiment the transmission includes a take-off point 290 for coupling to the motor 286. The motor 286 is coupled to a storage element 288 for supplying and receiving electrical energy as described above. The take off point 290 and motor 286 are configured in a manner similar to a starter motor in a conventional internal combustion engine vehicle, although the motor 286 is generally larger than a conventional starter motor and has a higher power capability. One example of this embodiment is a so-called "mild hybrid" in which the engine 282 shuts down when the vehicle is stopped, and the motor 286 restarts the engine when the operator produces a drive signal at an operator input device 192, thus conserving fuel when stopped. In the embodiment shown in FIG. 8, the processor circuit 80 shown in FIG. 2 may be implemented generally as described above to manage power in the hybrid vehicle 280.

While specific embodiments of the invention have been described and illustrated, such embodiments should be considered illustrative of the invention only and not as limiting the invention as construed in accordance with the accompanying claims.

What is claimed is:

1. A method for managing power in the hybrid vehicle, comprising: determining, based at least in part on one or more operating conditions of the hybrid vehicle, an amount of operating power to be supplied in response to a drive signal generated based on operator input; determining, for each of a plurality of apportionments of the operating power between an engine of the hybrid vehicle and a motor-generator of the hybrid vehicle, an overall operating cost value, each overall operating cost value accounting for at least a cost value associated with the engine of the hybrid vehicle and one or more constraints of a storage element of the hybrid vehicle; selecting an apportionment of the operating power from among the plurality of apportionments of the operating power, the selected apportionment being the apportionment with a minimum determined overall operating cost value; and causing the operating power to be supplied by at least one of the engine and the motor-generator in accordance with the selected apportionment.

2. The method of claim 1, wherein the cost value associated with the engine of the hybrid vehicle comprises an engine fuel consumption cost determined based at least in part on a fuel price.

3. The method of claim 1, further comprising receiving a signal representing an operating temperature of the engine, the cost value associated with the engine of the hybrid vehicle corresponding to the operating temperature of the engine.

4. The method of claim 1, wherein: the cost value associated with the engine of the hybrid vehicle comprises an engine fuel consumption cost; and for a particular apportionment of the operating power among the plurality of apportionments of the operating power, the engine fuel consumption cost is determined based at least in part on a fuel consumption cost associated with operating the engine to supply the particular apportionment of power.

5. The method of claim 1, wherein the one or more constraints of the storage element of the hybrid vehicle account for the state of charge of the storage element.

6. The method of claim 1, wherein the one or more constraints of the storage element of the hybrid vehicle account for the temperature of the storage element.

7. The method of claim 1, wherein the one or more constraints of the storage element of the hybrid vehicle account for the voltage present on the storage element.

8. An apparatus for managing power in a hybrid vehicle, the vehicle comprising an engine, an electric motor, and a storage element coupled to the electric motor, the apparatus comprising a controller operably configured to: determine, based at least in part on one or more operating conditions of the hybrid vehicle, an amount of operating power to be supplied in response to a drive signal generated based on operator input; determine, for each of a plurality of apportionments of the operating power between the engine of the hybrid vehicle and the electric motor of the hybrid vehicle, an overall operating cost value, each overall operating cost value accounting for at least a cost value associated with the engine of the hybrid vehicle and one or more constraints of the storage element of the hybrid vehicle; select an apportionment of the operating power from among the plurality of apportionments of the operating power, the selected apportionment being the apportionment with a minimum determined overall operating cost value; and cause the operating power to be supplied by at least one of the engine and the motor-generator in accordance with the selected apportionment.

9. The apparatus of claim 8, wherein the cost value associated with the engine of the hybrid vehicle comprises an engine fuel consumption cost determined based at least in part on a fuel price.

10. The apparatus of claim 8, wherein the controller is further operably configured to receive a signal representing an operating temperature of the engine, wherein the cost value associated with the engine of the hybrid vehicle corresponds to the operating temperature of the engine.

11. The apparatus of claim 8, wherein: the cost value associated with the engine of the hybrid vehicle comprises an engine fuel consumption cost; and for a particular apportionment of the operating power among the plurality of apportionments of the operating power, the engine fuel consumption cost is determined based at least in part on a fuel consumption cost associated with operating the engine to supply the particular apportionment of power.

12. The apparatus of claim 8, wherein the one or more constraints of the storage element of the hybrid vehicle account for the state of charge of the storage element.

13. The apparatus of claim 8, wherein the one or more constraints of the storage element of the hybrid vehicle account for the temperature of the storage element.

14. The method of claim 8, wherein the one or more constraints of the storage element of the hybrid vehicle account for the voltage present on the storage element.

15. A hybrid vehicle comprising: an engine; an electric motor; an energy storage element coupled to the motor; and a controller, the controller operably configured to: determine, based at least in part on one or more operating conditions of the hybrid vehicle, an amount of operating power to be supplied in response to a drive signal generated based on operator input; determine, for each of a plurality of apportionments of the operating power between the engine of the hybrid vehicle and the electric motor of the hybrid vehicle, an overall operating cost value, each overall operating cost value accounting for at least a cost value associated with the engine of the hybrid vehicle and one or more constraints of the storage element of the hybrid vehicle; select an apportionment of the operating power from among the plurality of apportionments of the operating power, the selected apportionment being the apportionment with a minimum determined overall operating cost value; and cause the operating power to be supplied by at least one of the engine and the motor-generator in accordance with the selected apportionment.

16. The hybrid vehicle of claim 15, wherein the cost value associated with the engine of the hybrid vehicle comprises an engine fuel consumption cost determined based at least in part on a fuel price.

17. The hybrid vehicle of claim 15, wherein the controller is further operably configured to receive a signal representing an operating temperature of the engine, wherein the cost value associated with the engine of the hybrid vehicle corresponds to the operating temperature of the engine.

18. The hybrid vehicle of claim 15, wherein: the cost value associated with the engine of the hybrid vehicle comprises an engine fuel consumption cost; and for a particular apportionment of the operating power among the plurality of apportionments of the operating power, the engine fuel consumption cost is determined based at least in part on a fuel consumption cost associated with operating the engine to supply the particular apportionment of power.

19. The hybrid vehicle of claim 15, wherein the one or more constraints of the storage element of the hybrid vehicle account for the state of charge of the storage element.

20. The hybrid vehicle of claim 15, wherein the one or more constraints of the storage element of the hybrid vehicle account for the temperature of the storage element.

21. The method of claim 15, wherein the one or more constraints of the storage element of the hybrid vehicle account for the voltage present on the storage element.

* * * * *